US005574461A

United States Patent [19]

Withag et al.

[11] Patent Number: 5,574,461

[45] Date of Patent: Nov. 12, 1996

[54] RADAR APPARATUS FOR CONNECTING TO A GUN

[75] Inventors: Antonius J. M. Withag, Hengelo; Peter J. Cool, Almelo; Henk Fischer, Hengelo, all of Netherlands

[73] Assignee: Hollandse Signaalapparaten B.V., Hengelo, Netherlands

[21] Appl. No.: 481,387

[22] PCT Filed: Jan. 12, 1994

[86] PCT No.: PCT/EP94/00093

§ 371 Date: Jul. 17, 1995

§ 102(e) Date: Jul. 17, 1995

[87] PCT Pub. No.: WO94/17566

PCT Pub. Date: Aug. 4, 1994

[30] Foreign Application Priority Data

Jan. 21, 1993 [NL] Netherlands ........................... 9300113

[51] Int. Cl.$^6$ ...................................................... G01S 13/72

[52] U.S. Cl. ............................... 342/67; 342/75; 342/153

[58] Field of Search ................................. 342/67, 74, 75, 342/77, 80, 149, 157

[56] References Cited

U.S. PATENT DOCUMENTS

| | | | |
|---|---|---|---|
| H205 | 2/1987 | Green et al. | 342/134 |
| 3,683,387 | 8/1972 | Meek | 343/761 |
| 3,924,235 | 12/1975 | Heller et al. | 342/75 |
| 4,224,507 | 9/1980 | Gendreu | 342/80 X |
| 5,073,782 | 12/1991 | Huguenin et al. | 342/179 |
| 5,075,680 | 12/1991 | Dabbs | 342/52 |
| 5,281,815 | 1/1994 | Even-Tov | 250/339 |

*Primary Examiner*—John B. Sotomayor
*Attorney, Agent, or Firm*—Oblon, Spivak, McClelland, Maier & Neustadt, P.C.

[57] ABSTRACT

A radar apparatus provided with a Cassegrain antenna to be mounted on the barrel of a gun. The Cassegrain antenna is of the polarization twist type with a flat adjustable mirror being used to generate a lead angle. In addition, gun-induced vibrations transmitted to the Cassegrain antenna are compensated by adjusting the flat mirror so that the radar beam generated by the Cassegrain antenna is not susceptible to these vibrations.

20 Claims, 2 Drawing Sheets

RADAR APPARATUS FOR CONNECTING TO A GUN

BACKGROUND OF THE INVENTION

1. Field of the Invention

The invention relates to a radar apparatus provided with an antenna for connecting to a substantially non-recoiling part of a gun barrel, of a gun equipped with servo motors, with a radar transmission device coupled to the antenna, a radar reception device coupled to the antenna, a radar data processor and servo control means, for controlling the servo motors such that in a first operational mode the gun with the antenna mounted on it is fit for automatically tracking a target.

2. Discussion of the Background

A radar apparatus of this kind is known from EP-A-0.198.964. In this known radar apparatus the gun center line and the line of sight of the antenna is fixed. The disadvantage is that a possible lead angle for the gun cannot be chosen dependent upon a set of target parameters, well known in the art. This limits the application of the known apparatus to situations where the distance between the target and the gun s small or the target is nonmoving.

SUMMARY OF THE INVENTION

The radar apparatus according to the invention eliminates this disadvantage and is characterized in that the antenna is a Cassegrain antenna provided with a flat mirror controlled with actuators, for generating in a second operational mode an angular offset between a gun center line and a line of sight of the antenna. A Cassegrain antenna having a flat mirror is known per se from U.S. Pat. No. 4,450,451, as part of a projectile provided with radar means. A possible disadvantage of mounting the Cassegrain antenna to the gun is that, when firing a salvo, vibrations from the gun may be propagated to the antenna. This may cause a rotational vibration around the center of gravity of the Cassegrain antenna and consequently adversely affect the accuracy of the target position measurement. The measurement of the error angles of a target using a monopulse or a conical scan radar reception device is known to be susceptible to this. An additional favourable embodiment of the radar apparatus according to the invention is therefore characterized in that the Cassegrain antenna is provided with rotation sensors for the detection of rotational vibrations induced by gun fire and in that the dataprocessor is capable of generating control signals on the basis of the rotation sensors output signals for controlling the actuators such that the line of sight of the Cassegrain antenna is at least substantially independent of the rotational vibrations. Besides causing a rotation of the Cassegrain antenna, vibrations may also bring about a translation in the direction of the line of sight. This translation will cause stationary objects to have an apparent Doppler velocity and may cause an apparent change in the Doppler velocity of a target. Both effects may degrade the performance of the radar apparatus that is always of the Doppler radar type in the application as described here. This especially holds true if the radar apparatus operates at relatively short wavelengths. This is also true for the radar apparatus described here. Only for short wavelengths the parabolic reflector will be so small that mounting to a gun becomes attractive. An other favourable embodiment is therefore characterized in that the Cassegrain antenna is provided with translation sensors for the detection of gun-fire-induced, translational vibrations in a direction of the line of sight and in that the dataprocessor is capable of generating control signals on the basis of translation sensor output signals for controlling the actuators such that for the transmitted and received radar radiation, the translation is at least substantially compensated.

BRIEF DESCRIPTION OF THE DRAWINGS

The invention will now be further described with reference to the following figures, of which.

DESCRIPTION OF THE PREFERRED EMBODIMENT

Figure 1:
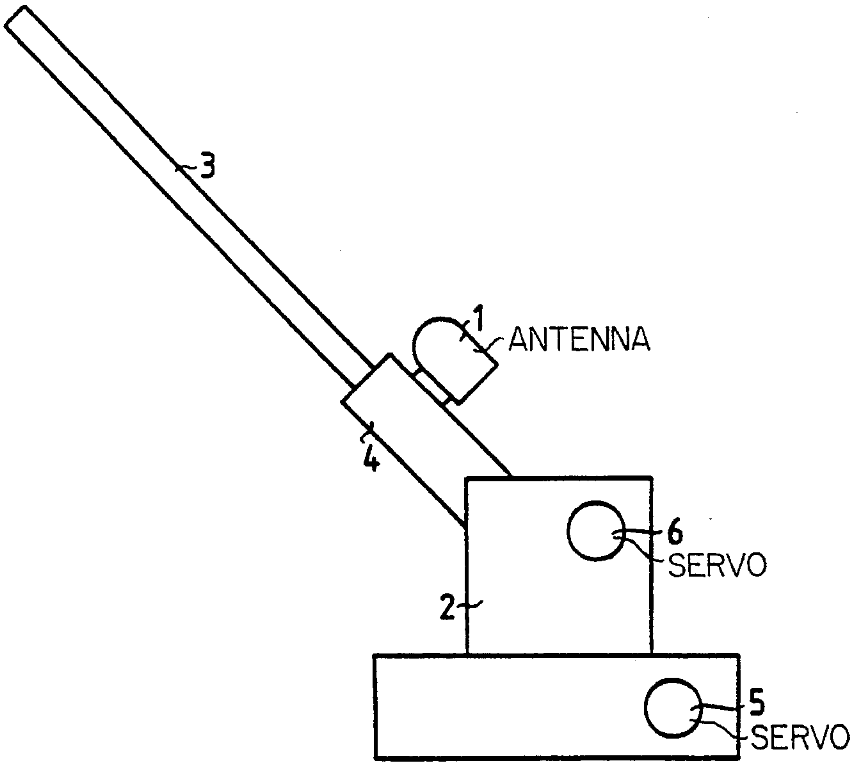
FIG. 1 indicates how a Cassegrain antenna and a gun can be built as one assembly.
Figure 2:
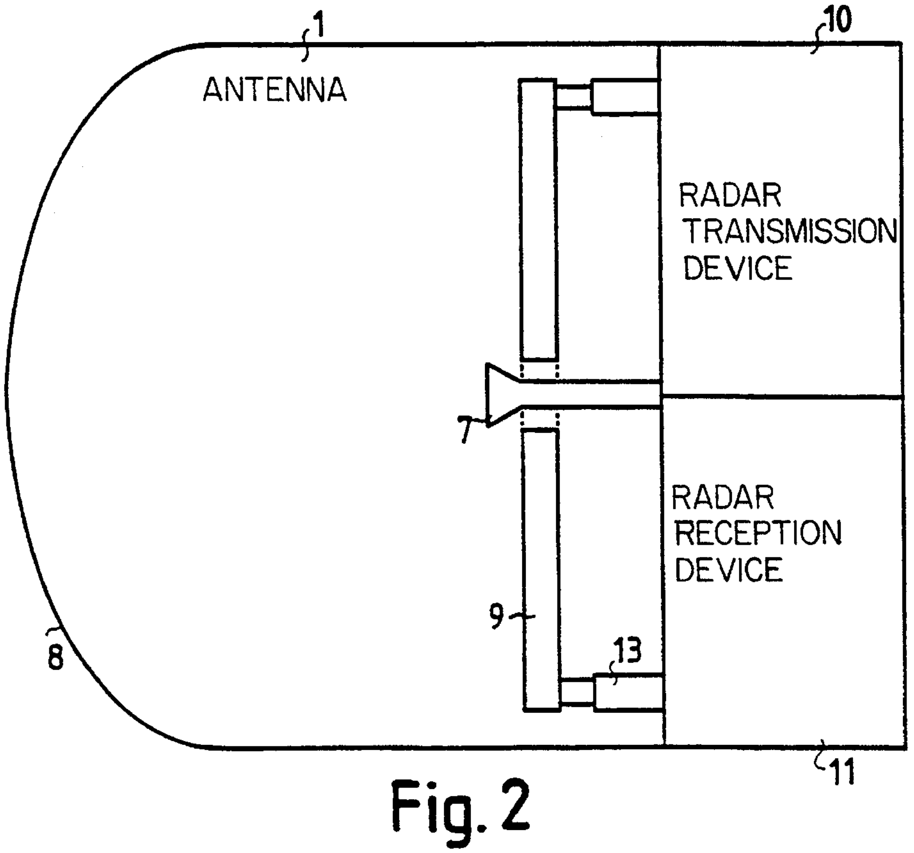
FIG. 2 represents a possible version of a Cassegrain antenna according to the invention.

Fig. 1 shows how Cassegrain antenna I and a gun 2 can be built as one assembly. In this figure the gun is provided with a barrel 3 that recoils heavily upon firing a round and with a barrel guide 4 that recoils only lightly upon firing a round. In addition, the gun is provided with a servo motor 5 for the azimuth rotation of barrel 3 and a servo motor 6 for the elevation rotation of barrel 3. Cassegrain antenna 1 is mounted to barrel guide 4. The positioning near barrel 3 yields only a small parallax error between the center line of barrel 3 and the sight line of Cassegrain antenna 1 and ensures that Cassegrain antenna 1 reliably follows each movement made by barrel 3. FIG. 2 shows the Cassegrain antenna I in sectional view. A feedhorn 7 of the monopulse type or of the conical scan type transmits radar radiation with a predetermined polarization direction to the parabolic reflector 8. Parabolic reflector 8 is provided with polarization-dependent reflection means, for instance metal wires that are positioned such as to reflect the polarized radar radiation. If, for instance, the radar radiation is horizontallay polarized, a near-complete reflection is obtained if the wires are positioned horizontally. The reflected radar radiation will now impinge on a flat mirror 9 that is provided with polarization-twisting reflection means, for instance metal wires that are angled 45 degrees with respect to the polarization direction of the radar radiation in combination with a reflecting mirror, located at a distance of a quarter of the wavelength of the radar radiation. As is generally known in radar technology, this will reflect the polarization direction, however, with a polarization direction that has been twisted 90 degrees with respect to the original polarization direction. As a result, the radar radiation will, after the second impingement upon the parabolic reflector 8, leave the Cassegrain antenna 1. Radar radiation reflected by a target is similarly supplied to feedhorn 7 in an identical way, entirely in agreement with the reciprocity principle for electromagnetic radiation.

The radar apparatus is furthermore provided with a radar transmission device 10 connected to the monopulse feedhorn and a radar reception device 11, which can both be integrated in the Cassegrain antenna 1. If Cassegrain antenna 1 is aimed at a target, radar reception device 11 produces, as is usual for a monopulse or a conical scan radar, an error voltage in elevation $\Delta B$, an error voltage in azimuth $\Delta E$, a sum voltage $\Sigma$and a distance R from the target to the radar for further processing. In addition, the radar apparatus, as known in the art, is capable of providing information concerning the velocity V of the target.

Figure 3:
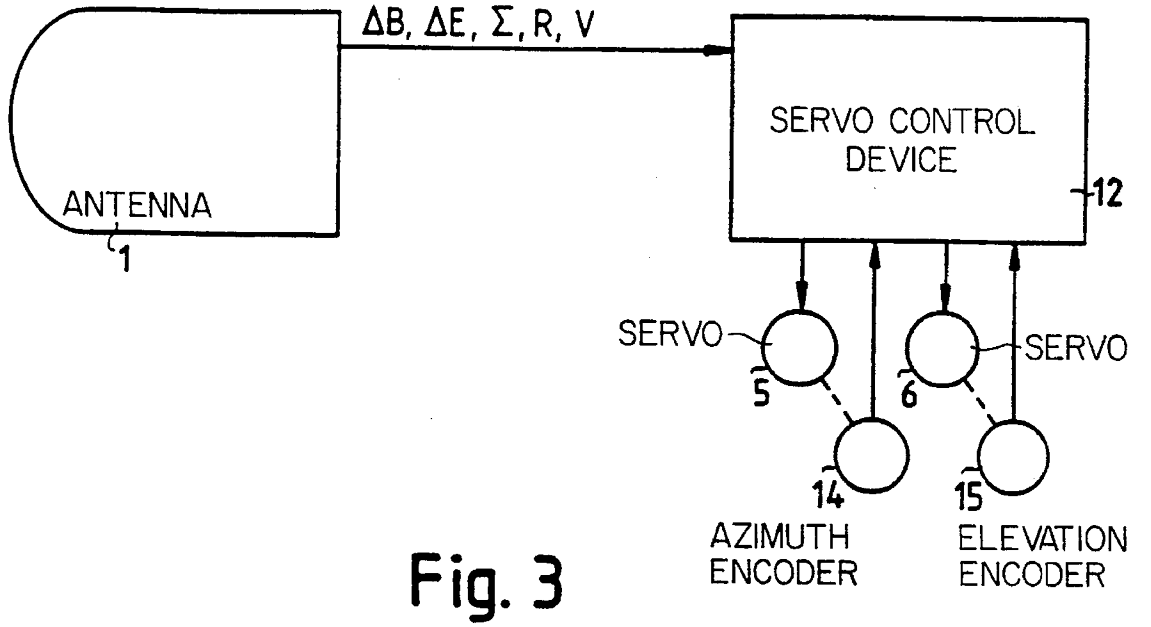
FIG. 3 represents a diagram of a first embodiment of the radar apparatus in operation with the gun.

FIG. 3 represents a diagram of a first embodiment of the radar apparatus in operation with the gun. The error voltages ΔB, ΔE, Σgenerated by the radar reception device, the target range R and the target velocity V are fed to radar dataprocessor and servo control device 12 which, in a way well-known in the art, controls servo motor 5 and servo motor 6 such as to yield minimal error voltages. Barrel 3 will then be aimed directly at the target.

A gun directly aimed at a target will generally miss this target, owing to the force of gravity affecting a round in flight and the target having its own velocity. In view of this, it is usual to aim a gun with a certain lead angle to compensate for these and any other ballistic effects. In case of the radar apparatus described here, this is possible by slightly rotating flat mirror 9. To this end, flat mirror 9 has been mounted movably, for instance by positioning it on top of actuators 13, as indicated in Fig. 2. By suitably driving actuators 13, a rotation of flat mirror 9 about its center can be effected in any given direction through, for instance, an angle Φ. This results in a rotation of the line of sight of the radar apparatus through an angle 2Φ. When using the radar apparatus for automatic target tracking, a target as described above, will be tracked in a first operational mode. From the data thus obtained, radar data processor and servo control device 12 will determine a desired lead angle. Prior to and during firing, the desired lead angle is realised in a second operational mode by a suitable control of actuators 13.

In order to determine a number of ballistic data which co-determine the lead angle, knowledge of the absolute position of barrel 3 is indispensable. In view of this, gun 2 is provided with an azimuth encoder 14 and an elevation encoder 15, the values of which are fed to data processor and servo control device 12. Said encoders can also be advantageously used for initially aiming barrel 3 at a target, as the initial position of the target usually originates from another sensor. Dataprocessor and servo control device 12 will steer control servo motors 5 and 6 such that the position of barrel 3 corresponds with the received initial position, after which a search scan, well known in the art will be executed.

If gun 2 fires a salvo, the recoil of barrel guide 4, however slight, will set Cassegrain antenna 1 vibrating. These vibrations can be distinguished into rotations about a center of gravity of the antenna, translations in the direction of the line of sight and translations perpendicular to the line of sight. The latter translations barely affect the gun control, but rotations around the center of gravity and translations in the direction of the line of sight may require additional provisions. Rotations around the center of gravity will directly affect the output error voltages. A rotation about an angle Φ can however be compensated by rotating flat mirror 9 through an angle −½Φ. In this respect it is relevant for flat mirror 9 to be of light construction and for actuators 13 and the required control to have sufficient bandwidth so as to compensate for gun-induced rotations. Actuators 13 may be designed as linear actuators based on the voice coil principle, the required rigidity and accuracy being obtained by means of a feedback loop. Furthermore it is of importance to select the radar transmit frequency of the radar apparatus to be high, as a result of which the dimensions of Cassegrain antenna 1 will be small and flat mirror 9 will as a consequence be small and light, so that a large bandwidth will be more easily attained.

Translations in the direction of the line of sight will cause stationary objects to have an apparent Doppler velocity. This may severely degrade the performance of the radar system which, in the application described here, is always an MTI or MTD type of radar. Especially when tracking a target near the horizon, it may cause clutter breakthrough well-known in the art, which could entail a loss of the target. This effect will be more noticeable as the radar transmit frequency of the radar apparatus increases.

In case of an MTD radar, which accurately determines the velocity of a target using a Doppler filter bank, the velocity information is used for distinguishing the target with regard to its background. Translations of Cassegrain antenna I in the direction of the line of sight may affect the accurate determination of the velocity, which could entail a loss of the target. Also this effect will become more noticeable as the radar transmit frequency of the radar apparatus increases.

A suitable compromise between the dimensions of the Cassegrain antenna 1 on the one hand and the above-mentioned problems on the other hand is obtained at a radar transmit frequency of 15 –30 GHz. At these radar transmit frequencies, it is required to compensate for said translations. Compensation is possible by means of flat mirror 9, by translating flat mirror 9 over a distance –d/2 at a translation of Cassegrain antenna 1 over a distance d.

Figure 4:
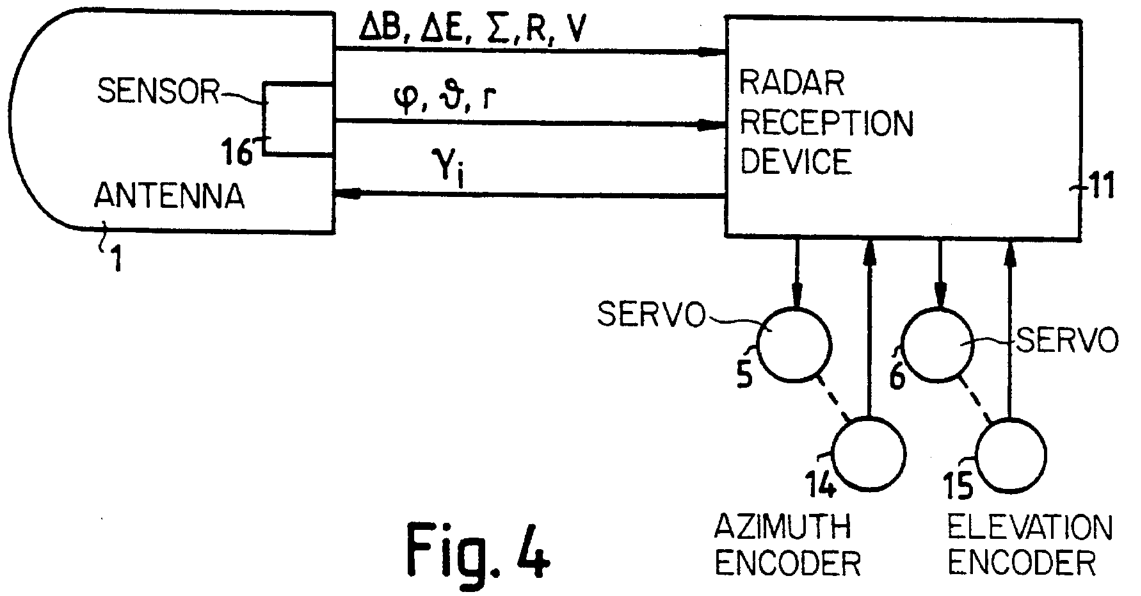
FIG. 4 represents a diagram of a second embodiment of the radar apparatus in operation with the gun, in which provisions have been made to compensate for the vibrations induced by the gun.

FIG. 4 represents a diagram of a second embodiment of the radar apparatus in operation with the gun, the above compensations having been realised. In this diagram, Cassegrain antenna 1 is provided with a sensor box 16, which generates the signals ϕ and υ representing the rotations in azimuth and in elevation. In addition, sensor box 16 generates a signal r representing the line of sight translation. To this end, sensor box 16 comprises a gravity-compensated acceleration sensor for accelerations in the direction of the line of sight, followed by an integrator. For the generation of the signals ϕ and υ, sensor box 16 for instance comprises a rate gyro for determining the angular velocities in azimuth and elevation followed by two integrators. By activating said integrators shortly before firing a salvo, it is possible to accurately determine said translation and rotations. The measured values ϕ, υ and r are fed to radar dataprocessor and servo control device 12, which determines the desired compensation values, compensates for rotations performed by the gun and combines the compensation values thus obtained with the lead angle to be fed to the n actuators 13 as control values ≢ =1, . . ,n.

We claim:

1. Radar apparatus provided with an antenna for connecting to a substantially non-recoiling part of a gun barrel, of a gun equipped with servo motors, with a radar transmission device coupled to the antenna, a radar reception device coupled to the antenna, a radar data processor and servo control means, for controlling the servo motors such that in a first operational mode the gun with the antenna mounted on it is fit for automatically tracking a target, characterized in that the antenna is a Cassegrain antenna provided with a flat mirror controlled with actuators, for generating in a second operational mode an angular offset between a gun center line and a line of sight of the antenna.

2. Radar antenna as claimed in claim 1, characterized in that the Cassegrain antenna is provided with translation sensors for detecting gunfire-induced, translational vibrations in a direction of the line of sight and that the dataprocessor is capable of generating control signals on the basis of the translation sensor output signals for controlling the actuators such that the translation is, at least substantially, compensated for the transmitted and received radar radiation.

3. Radar apparatus as claimed in Claim 2, characterized in that the translation sensors comprise an acceleration sensor.

4. Radar apparatus as claimed in claim 3, characterized in that the translation sensors furthermore comprise an integrator connected to the acceleration sensor.

5. Radar apparatus as claimed in claim 1, characterized in that the actuator comprises a linear actuator.

6. Radar apparatus as claimed in claim 5, characterized in that the linear actuator is of the voice coil type and is provided with a feedback loop.

7. Radar apparatus as claimed in claim 1, characterized in that the Cassegrain antenna is provided with rotation sensors for the detection of rotational vibrations induced by gun fire and in that the dataprocessor is capable of generating control signals on the basis of the rotation sensors output signals for controlling the actuators such that the line of sight of the Cassegrain antenna is at least substantially independent of the rotational vibrations.

8. Radar apparatus as claimed in claim 7, characterized in that the rotation sensors comprise a rate gyro.

9. Radar apparatus as claimed in claim 8, characterized in that the actuator comprises a linear actuator.

10. Radar apparatus as claimed in claim 9, characterized in that the linear actuator is of the voice coil type and is provided with a feedback loop.

11. Radar apparatus as claimed in claim 8, characterized in that the rotation sensors also comprise two integrators connected to the rato gyro for delivering rotation vibration-representing signals.

12. Radar apparatus as claimed in claim 11, characterized in that the actuator comprises a linear actuator.

13. Radar apparatus as claimed in claim 12, characterized in that the linear actuator is of the voice coil type and is provided with a feedback loop.

14. Radar antenna as claimed in claim 7, characterized in that the Cassegrain antenna is provided with translation sensors for detecting gunfire-induced, translational vibrations in a direction of the line of sight and that the dataprocessor is capable of generating control signals on the basis of the translation sensor output signals for controlling the actuators such that the translation is, at least substantially, compensated for the transmitted and received radar radiation.

15. Radar apparatus as claimed in claim 14, characterized in that the actuator comprises a linear actuator.

16. Radar apparatus as claimed in claim 15, characterized in that the linear actuator is of the voice coil type and is provided with a feedback loop.

17. Radar apparatus as claimed in claim 14, characterized in that the translation sensors comprise an acceleration sensor.

18. Radar apparatus as claimed in claim 17, characterized in that the translation sensors furthermore comprise an integrator connected to the acceleration sensor.

19. Radar apparatus as claimed in characterized in that the actuator comprises a linear actuator.

20. Radar apparatus as claimed in claim 19, characterized in that the linear actuator is of the voice coil type and is provided with a feedback loop.

* * * * *

UNITED STATES PATENT AND TRADEMARK OFFICE

CERTIFICATE OF CORRECTION

PATENT NO. : 5,574,461

DATED : November 12, 1996

INVENTOR(S) : Antonius J.M. WITHAG et al.

It is certified that error appears in the above-indentified patent and that said Letters Patent is hereby corrected as shown below:

In column 1, line 24, change "s small" to --is small--.

Column 2, line 55, "Radar" should begin a new paragraph.

In column 2, line 65, change "$\Delta B$" to --$\Delta E$--; same line, change "$\Delta E$" to --$\Delta B$--.

In column 4, line 44, change "*=1,..,n" to --$\gamma_i$, i=1,..,n--.

In the drawings, Figure 4, change "RADAR RECEPTION DEVICE" to --SERVO CONTROL DEVICE--; also, change "11" to --12--.

Signed and Sealed this

Twelfth Day of August, 1997

Attest:

BRUCE LEHMAN

*Attesting Officer*

*Commissioner of Patents and Trademarks*